(12) United States Patent
Sandstrom

(10) Patent No.: US 6,448,318 B1
(45) Date of Patent: Sep. 10, 2002

(54) METHOD OF PROCESSING RUBBER COMPOSITIONS CONTAINING SOYA FATTY ACIDS, SUNFLOWER FATTY ACIDS AND MIXTURES THEREOF

(75) Inventor: Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/523,004

(22) Filed: Mar. 10, 2000

(51) Int. Cl.$^7$ ................................................ C08K 61/22
(52) U.S. Cl. ...................... 524/284; 524/773; 524/599; 524/925
(58) Field of Search ................................ 524/284, 724, 524/764, 773, 925

(56) References Cited

U.S. PATENT DOCUMENTS

| 5,604,290 A | | 2/1997 | Aikawa et al. | ............. 524/529 |
| 5,650,454 A | * | 7/1997 | Hoover et al. | ................. 524/47 |

FOREIGN PATENT DOCUMENTS

| EP | 0363302 | 4/1990 | ............ C08K/5/09 |
| EP | 0661343 | 7/1995 | ............ C08L/7/00 |

* cited by examiner

Primary Examiner—David W. Wu
Assistant Examiner—R. Harlan
(74) Attorney, Agent, or Firm—Bruce J. Hendricks; John D. DeLong

(57) ABSTRACT

There is disclosed a method of thermomechanically mixing of a rubber composition containing a fatty acid selected from the group consisting of soya fatty acid, sunflower fatty acid and mixtures thereof.

17 Claims, No Drawings

METHOD OF PROCESSING RUBBER COMPOSITIONS CONTAINING SOYA FATTY ACIDS, SUNFLOWER FATTY ACIDS AND MIXTURES THEREOF

FIELD OF THE INVENTION

The present invention relates to a method of processing rubber compositions containing soya fatty acids, sunflower fatty acids and mixtures thereof and the rubber compositions made therefrom.

BACKGROUND OF THE INVENTION

Processing aids are commonly used in both natural and synthetic rubber compositions. Representative examples of processing aids include petroleum and naphthenic oils. Such processing aids are used during the mixing, permitting incorporation of fillers and other ingredients rapidly with lower power consumption.

U.S. Pat. Nos. 4,870,135 and 4,895,911 relate to a method for enhancing the cure of a sulfur vulcanizable elastomer which comprises adding to the elastomer a mixture of tall oil fatty acids comprising (a) from 28 to 55 percent by weight of oleic acid;

(b) from 25 to 40 percent by weight of linoleic acid;

(c) from 4 to 20 percent by weight conjugated linoleic acid; and (d) from 0 to 8 percent by weight rosin acids.

SUMMARY OF THE INVENTION

The present invention relates to the thermomechanically mixing of a rubber composition containing a fatty acid selected from the group consisting of soya fatty acid, sunflower fatty acid and mixtures thereof.

DETAILED DESCRIPTION OF THE INVENTION

There is disclosed a method for processing a rubber composition which comprises thermomechanically mixing at a rubber temperature in a range of from 140° C. to 190° C. for a mixing time of from 4 minutes to 20 minutes, (i) 100 parts by weight of at least one uncured elastomer containing olefinic unsaturation selected from the group consisting of natural rubber and conjugated diene homopolymers and copolymers and from copolymers of at least one conjugated diene and aromatic vinyl compound; with (ii) 1 to 25 phr of a fatty acid selected from the group consisting of soya fatty acid, sunflower fatty acids and mixtures thereof.

There is also disclosed a rubber composition which is produced by the sulfur vulcanization of a rubber composition which had been previously thermomechanically mixed with 1 to 25 phr of a fatty acid selected from the group consisting of soya fatty acids, sunflower fatty acids and mixtures thereof.

The present invention may be used to process uncured rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and, in particular, ethylene/propylene/dicyclopentadiene terpolymers. The preferred rubber or elastomers are polybutadiene and SBR.

In one aspect, the rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/lisoprene/butadiene rubber, emulsion and solution polymerization derived styrenel/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content; namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The fatty acids for use in the present invention include soya fatty acids, sunflower fatty acids and mixtures thereof. Preferably, the fatty acid is soya fatty acids. The fatty acids are predominately 18 carbon straight chain fatty acids including linoleic acid and oleic acid. The representative weight percentages of the fatty acids may be determined according to ASTM D-803-65. The amount of linoleic acid generally ranges from 50 to 68 percent by weight. Preferably the amount of linoleic acid is approximately 51 to 52 percent. The amount of oleic acid generally ranges from 19 to 30 percent by weight. Preferably, the level of oleic acid is around 29 percent. In addition to the above, the fatty acid may contain palmitic, linolenic and stearic acid. The palmitic acid is generally present in an amount ranging from 7 to 12 percent by weight, with a range of from 8 to 11 being preferred. The linolenic acid is generally present in an amount ranging from 0 to 9 percent. Preferably, the level of linolenic acid ranges from 5 to 8 percent. The stearic acid is generally present in an amount ranging from 2 to 5 percent by weight, with a range of from 3 to 4 being preferred.

The acid values for the fatty acids may range from 195 to 204. Preferably, the acid value ranges from 197 to 203.

The iodine value for the fatty acids may range from 120 to 142 (Wijs). Preferably, the iodine value ranges from 130 to 134.

The saponification value for preferred soya fatty acids may range from 197 to 207. A range of from 197 to 203 is preferred.

The titer value in ° C. for preferred soya fatty acids range from 21 to 29, with a range of from 21 to 26 being preferred.

The above physical characterizations are intended to exclude epoxidized soybean oil and hydrogenated soybean oil. Commercial sources of suitable soya fatty acids and sunflower fatty acids include Proctor & Gamble Chemicals sold under the designation Soya S-210 and Sunflower S-205.

The amount of fatty acids may vary widely depending on the type of rubber and other compounds present in the rubber composition. Generally, the amount of fatty acids are used in a range of from about 1 to about 25 phr with a range of 2 to about 15 phr being preferred.

In a preferred embodiment, the rubber composition contains a sufficient amount of filler to contribute a reasonably high modulus and high resistance to tear. The filler may be added in amounts ranging from 10 to 150 phr. When the filler is silica, the silica is generally present in an amount ranging from 10 to 80 phr. Preferably, the silica is present in an amount ranging from 15 to 70 phr. When the filler is carbon black, the amount of carbon black will vary from 0 to 120 phr. Preferably, the amount of carbon black will range from 0 to 80 phr.

The commonly employed particulate precipitated silica used in rubber compounding applications can be used as the silica in this invention. These precipitated silicas include, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

The processing of the sulfur vulcanizable rubber may be conducted in the presence of a sulfur containing organosilicon compound. Examples of suitable sulfur containing organosilicon compounds are of the formula:

$$Z\text{-Alk-}S_n\text{-Alk-}Z \qquad (I)$$

in which Z is selected from the group consisting of

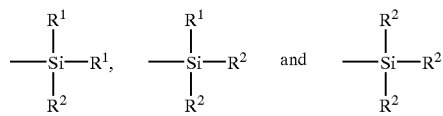

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; and Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"- ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclohexoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl)tetrasulfide, 12,12'-bis (triisopropoxysilyl dodecyl)disulfide, 18,18'-bis (trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis (triethoxysilylpropyl)tetrasulfide. Therefore, as to formula I, preferably Z is

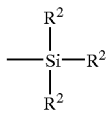

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I, if used, will range from 0.5 to 15 phr. Preferably, the amount will range from 1.5 to 10 phr.

It is readily understood by those having skill in the art that the remaining ingredients in the rubber compound may contain various commonly used additive materials such as, for example, sulfur donors, curing aids, such as activators and retarders and processing additives, such as oils, resins including tackifying resins and plasticizers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

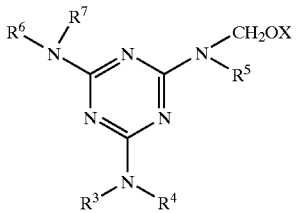

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group —CH2OX. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N'-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that are present will range from about 0.1 phr to 10.0 phr. Preferably, the amount of methylene donor and methylene acceptor ranges from about 2.0 phr to 5.0 phr for each.

The weight ratio of methylene donor to the methylene acceptor may vary. Generally speaking, the weight ratio will range from about 1:10 to about 10:1. Preferably, the weight ratio ranges from about 1:3 to 3:1.

A critical aspect of the present invention is the mixing of the rubber composition. For example, the ingredients are typically mixed in at least two stages; namely, at least one non-productive stage followed by a productive mix stage. Three stages may be used where there is two non-productive stages followed by a productive stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The productive stage is characterized by mixing at a rubber temperature range, from 100 to 115° C. for a mixing time of from 1.0 to 3.0 minutes. The rubber and soybean oil are mixed in one or more non-productive mix stages. The terms "non-productive" and "productive" mix stages are well known to those having skill in the rubber mixing art. The rubber composition containing the soybean oil, rubber, silica and sulfur-containing organosilicon compound, if used, are subjected to a thermomechanical mixing step. The thermomechanical mixing step involves mechanical working the rubber compound in a mixer or extruder at a rubber temperature between 140° C. and 190° C. The appropriate duration of the thermomechanical working varies as a function of the operating conditions and the volume and nature of the components. For example, the thermomechanical working may range from 4 to 20 minutes.

Vulcanization of the rubber composition of the present invention is generally carried out by heating the rubber component to rubber temperatures ranging from about 100° C. to 200° C. Preferably, the vulcanization is conducted at rubber temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the *Vanderbilt Rubber Handbook* edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of the *Vanderbilt Rubber Handbook*.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The invention may be better understood by reference to the following examples in which the parts and percentages are by weight unless otherwise indicated.

EXAMPLE 1 CONTROL

In this example, naphthenic/paraffinic oil, epoxidized soybean oil and soya fatty acids (soybean oil) were each evaluated in a rubber composition, which contained 35 phr silica and 15 phr carbon black without a thermomechanical mixing stage. All samples are considered controls due to the absence of thermomechanical mixing. The actual makeup of the soybean oil was about 52 percent by weight linoleic acid, about 24 percent by weight oleic acid, about 8 percent by weight linolenic acid, and about 4 percent by weight stearic acid. The epoxidized soybean oil was obtained from Union Carbide under the designation Flexol EPO. The soybean oil was obtained from Proctor & Gamble Chemicals under the designation Soya S-210.

Rubber compositions containing the materials set out in Table 1 were prepared in a BR Banbury™ mixer using three separate stages of addition (mixing); namely, two non-productive mix stages and one productive mix stage. The first non-productive stage was mixed for 3 minutes or to a rubber temperature of 160° C., whichever occurred first. The second non-productive stage was mixed for 2 minutes or to a rubber temperatures of 150° C., whichever occurred first. The mixing time for the productive stage was about 2 minutes to a final rubber temperature of 108° C.

The rubber compositions are identified herein as Samples 1 through 3. Sample 1 contained 5 phr of conventional processing oil, whereas Sample 2 contained 5 phr of epoxidized soybean oil and Sample 3 contained 5 phr of soybean oil.

The samples were cured at about 150° C. for about 36 minutes.

Table 2 illustrates the cure behavior and cured physical properties of Samples 1 through 3.

Sample 3, which contains 5 phr soybean oil, when compared to Sample 1, which contains 5 phr conventional processing oil, exhibits comparable cure behavior, stress-strain properties, hardness, rebound and dynamic properties. However, it also exhibits a higher DIN abrasion value which indicates worse abrasion resistance. Sample 2, which contains 5 phr epoxidized soybean oil, exhibits properties inferior to Control Sample 1 and Sample 3, particularly worse abrasion resistance. These samples were produced without a thermomechanical mixing stage during Banbury mixing.

TABLE 1

|  | Sample 1 | Sample 2 | Sample 3 |
|---|---|---|---|
| First Non-Productive |  |  |  |
| Polyisoprene[1] | 100 | 100 | 100 |
| Carbon black, N299 | 15 | 15 | 15 |
| Silica[2] | 20 | 20 | 20 |
| Processing oil | 5 | 0 | 0 |
| Epoxidized soybean oil | 0 | 5 | 0 |
| Soybean oil | 0 | 0 | 5 |
| Silane coupling agent[3] (50%) | 3 | 3 | 3 |
| Zinc oxide | 5 | 5 | 5 |
| Fatty acid | 2 | 2 | 2 |
| Antioxidant[4] | 2 | 2 | 2 |
| Second Non-Productive |  |  |  |
| Silica[2] | 15 | 15 | 15 |
| Silane coupling agent[3] (50%) | 2 | 2 | 2 |
| Productive |  |  |  |
| Sulfur | 1.5 | 1.5 | 1.5 |
| Accelerator, sulfenamide | 2 | 2 | 2 |
| Accelerator, diphenylguanidine | 0.5 | 0.5 | 0.5 |

[1]Synthetic cis 1,4-polyisoprene which is commercially available from The Goodyear Tire & Rubber Company under the designation Natsyn ® 2200
[2]Precipitated silica which is commercially available from the PPG Company under the designation Hil Sil ™ 210
[3]Obtained as bis-(3-triethoxysilylpropyl)tetrasulfide, which is commercially available as X50S form Degussa GmbH and is provided in a 50/50 by weight blend with carbon black.
[4]Polymerized 1,2-dihydro 2,2,4-trimethylquinoline type
[5]50/50 by weight blend with carbon black.

TABLE 2

| Samples | 1 | 2 | 3 |
|---|---|---|---|
| Processing oil | 5 | 0 | 0 |
| Epoxidized soybean oil | 0 | 5 | 0 |
| Soybean oil | 0 | 0 | 5 |
| Thermomechanical mixing | No | No | No |
| Rheometer 150° C. |  |  |  |
| Max Torq | 44 | 40 | 42 |
| Min Torq | 4.8 | 4.3 | 4.4 |
| Delta Torq | 39.5 | 35.7 | 37.6 |
| T90 | 15.8 | 13.5 | 14.8 |
| Reversion at 60 minutes | 0.3 | 2 | 0.1 |
| Stress Strain 36' at 150° C. |  |  |  |
| 100% M (MPa) | 2.7 | 2.2 | 2.5 |
| 300% M (MPa) | 12.1 | 8.4 | 10.9 |

TABLE 2-continued

| Samples | 1 | 2 | 3 |
|---|---|---|---|
| Tensile strength (MPa) | 20.4 | 19.9 | 20.7 |
| Elongation at Break (%) | 483 | 595 | 520 |
| Hardness |  |  |  |
| RT | 66 | 66.4 | 65.3 |
| 100° C. | 63.4 | 60.2 | 61.9 |
| Rebound |  |  |  |
| RT | 54.1 | 42.1 | 52.5 |
| 100° C. | 68.8 | 62.6 | 67.2 |
| E', 60° C., (MPa) | 21.4 | 18.2 | 22 |
| Tan Delta | 0.051 | 0.112 | 0.055 |
| DIN Abrasion (lower is better) | 106 | 149 | 116 |

EXAMPLE II

In this example, naphthenic/paraffinic oil, epoxidized soybean oil and soya fatty acids (soybean oil) were each evaluated in a rubber composition which contained 35 phr silica and 15 phr carbon black, with a thermomechanical mixing stage of 6 minutes at 160° C. The materials used were the same as in Example I.

Rubber compositions containing the materials set out in Table 3 were prepared in a BR Banbury™ using three separate stages of addition (mixing); namely, two non-productive mix stages and one productive mix stage. The first non-productive stage was mixed for 3 minutes or to a rubber temperature of 160° C., whichever occurred first. The second non-productive mix stage was mixed for about two minutes to a rubber temperature of 160° C. and then mixed an additional 6 minutes at a temperature of 160° C. This represents a thermomechanical mixing step as previously described. The mixing time for the productive stage was about 2 minutes to a final temperature of 108° C.

The rubber compositions are identified herein as Samples 4 through 6. Samples 4 and 5 represent controls using 5 phr of conventional processing oil, or epoxidized soybean oil, whereas Sample 6 represents the present invention containing 5 phr of soybean oil with thermomechanical mixing. The samples were cured at about 150° C. for about 36 minutes. Table 4 illustrates the cure behavior and cured physical properties of Samples 4 through 6.

Sample 6, which contains 5 phr soybean oil, when compared to Sample 4, which contains 5 phr conventional processing oil, exhibits comparable cure behavior, stress-strain properties, hardness, rebound and dynamic properties. It also exhibits improved DIN abrasion resistance compared to Control Sample 4. In this case, the heat treatment step has provided improved abrasion resistance in contrast to Example I which showed inferior DIN abrasion without the thermomechanical heat treatment step.

TABLE 3

|  | Sample 4 | Sample 5 | Sample 6 |
|---|---|---|---|
| First Non-Productive |  |  |  |
| Polyisoprene[1] | 100 | 100 | 100 |
| Carbon black, N299 | 15 | 15 | 15 |
| Silica[2] | 20 | 20 | 20 |
| Processing oil | 5 | 0 | 0 |
| Epoxidized soybean oil | 0 | 5 | 0 |
| Soybean oil | 0 | 0 | 5 |
| Silane coupling agent[3] (50%) | 3 | 3 | 3 |

TABLE 3-continued

|  | Sample 4 | Sample 5 | Sample 6 |
| --- | --- | --- | --- |
| Zinc oxide | 5 | 5 | 5 |
| Fatty acid | 2 | 2 | 2 |
| Antioxidant[4] | 2 | 2 | 2 |
| Second Non-Productive |  |  |  |
| Silica[2] | 15 | 15 | 15 |
| Silane coupling agent[3] (50%) | 2 | 2 | 2 |
| Productive |  |  |  |
| Sulfur | 1.5 | 1.5 | 1.5 |
| Accelerator, sulfenamide | 2 | 2 | 2 |
| Accelerator, diphenylguanidine | 0.5 | 0.5 | 0.5 |

[1]Synthetic cis 1,4-polyisoprene which is commercially available from The Goodyear Tire & Rubber Company under the designation Natsyn ® 2200
[2]Precipitated silica which is commercially available from the PPG Company under the designation Hil Sil ™ 210
[3]Obtained as bis-(3-triethoxysilylpropyl)tetrasulfide, which is commercially available as X50S form Degussa GmbH and is provided in a 50/50 by weight blend with carbon black.
[4]Polymerized 1,2-dihydro 2,2,4-trimethylquinoline type
[5]50/50 by weight blend with carbon black.

TABLE 4

| Samples | 4 | 5 | 6 |
| --- | --- | --- | --- |
| Processing oil | 5 | 0 | 0 |
| Epoxidized soybean oil | 0 | 5 | 0 |
| Soybean oil | 0 | 0 | 5 |
| Thermomechanical mixing | Yes | Yes | Yes |
| Rheometer 150° C. |  |  |  |
| Max Torq | 43.5 | 39.8 | 41.6 |
| Min Torq | 5 | 5.3 | 5 |
| Delta Torq | 38.5 | 34.5 | 36.6 |
| T90 | 15.5 | 13.8 | 15 |
| Reversion at 60 minutes | 0.2 | 2 | 0.3 |
| Stress Strain 36' at 150° C. |  |  |  |
| 100% M (MPa) | 2.7 | 2 | 2.5 |
| 300% M (MPa) | 11.7 | 8 | 11 |
| Tensile strength (MPa) | 22.3 | 20.5 | 22.4 |
| Elongation at Break (%) | 545 | 633 | 567 |
| Hardness |  |  |  |
| RT | 66.5 | 64.2 | 64 |
| 100° C. | 63.8 | 59.7 | 62.1 |
| Rebound |  |  |  |
| RT | 53.4 | 41 | 53 |
| 100° C. | 68.4 | 62.3 | 68.1 |
| E', 60° C., (MPa) | 15.9 | 15 | 14.1 |
| Tan Delta | 0.06 | 0.11 | 0.066 |
| DIN Abrasion (lower is better) | 128 | 157 | 118 |

EXAMPLE III CONTROL

In this example, a highly aromatic oil, epoxidized soybean oil and soybean oil, were each evaluated in a rubber composition which contained 50 phr carbon black and were not subjected to a thermomechanical mixing stage in the Banbury. All samples are considered controls due to the absence of the thermomechanical mixing.

Rubber compositions containing the materials set out in Table 5 were prepared in a BR Banbury™ using three separate stages of mixing; namely, two non-productive mix stages and one productive mix stage. The first non-productive stage was mixed about 3 minutes to a final temperature of 160° C. The second non-productive stage was mixed about 2 minutes to a final temperature of 150° C. The productive stage was mixed about 2 minutes to a final temperature of 108° C.

The rubber compositions are identified herein as Samples 7 through 9. Sample 7 contained 5 phr highly aromatic oil. Sample 8 contained 5 phr epoxidized soybean oil and Sample 9 contained 5 phr soybean oil. The samples were cured at about 150° C. for about 36 minutes. Table 6 illustrates the cure behavior and cured physical properties of Samples 7 through 9.

Sample 9, which contains 5 phr soybean oil, when compared to Sample 7, which contains 5 phr conventional processing oil exhibits comparable cure behavior and cured properties. Sample 8 containing epoxidized soybean oil has inferior properties.

TABLE 5

|  | Sample 7 | Sample 8 | Sample 9 |
| --- | --- | --- | --- |
| First Non-Productive |  |  |  |
| Polyisoprene (natural rubber) | 100 | 100 | 100 |
| Carbon black, (N110) | 30 | 30 | 30 |
| Wax | 2 | 2 | 2 |
| Zinc oxide | 2 | 2 | 2 |
| Stearic acid | 2 | 2 | 2 |
| Aromatic oil[1] | 5 | 0 | 0 |
| Epoxidized soybean oil | 0 | 5 | 0 |
| Soybean oil | 0 | 0 | 5 |
| Second Non-Productive |  |  |  |
| Carbon black (N110) | 20 | 20 | 20 |
| Antidegradents[2] | 2 | 2 | 2 |
| Wax | 1 | 1 | 1 |
| Productive |  |  |  |
| Accelerator, sulfenamide | 1 | 1 | 1 |
| Zinc oxide | 2 | 2 | 2 |
| Sulfur | 1.2 | 1.2 | 1.2 |

[1]Sundex 8125 from Sun Oil Co.
[2]Quinoline and para-phenylene diamine blend

TABLE 6

| Samples | 7 | 8 | 9 |
| --- | --- | --- | --- |
| Processing oil | 5 | 0 | 0 |
| Epoxidized soybean oil | 0 | 5 | 0 |
| Soybean oil | 0 | 0 | 5 |
| Thermomechanical mixing | No | No | No |
| Rheometer 150° C. |  |  |  |
| Max Torq | 36.4 | 33 | 34.2 |
| Min Torq | 8.4 | 8.5 | 8 |
| Delta Torq | 28 | 24.5 | 26.2 |
| T90, minutes | 17 | 18.3 | 17 |
| Stress Strain 36' at 150° C. |  |  |  |
| 100% M (MPa) | 1.9 | 1.3 | 1.8 |
| 300% M (MPa) | 11.8 | 8.1 | 11.0 |
| Tensile strength (MPa) | 23.2 | 19.4 | 22.5 |
| Elongation at Break (%) | 525 | 573 | 538 |
| Hardness |  |  |  |
| RT | 62 | 57 | 60 |
| 100° C. | 53 | 47 | 52 |
| Rebound |  |  |  |
| RT | 42 | 38 | 44 |
| 100° C. | 60 | 54 | 61 |
| DIN Abrasion (lower is better) | 128 | 213 | 130 |

EXAMPLE IV

In this example, a naphthenic/paraffinic oil, epoxidized soybean oil and soybean oil, were each evaluated in a rubber composition which contained 50 phr carbon black and were subjected to a heat treatment or thermomechanical mixing stage in the Banbury.

Rubber compositions containing the materials set out in Table 7 were prepared in a BR Banbury™ using three separate stages of mixing; namely, two non-productive mix stages and one productive mix stage. The first non-productive stage was mixed about 3 minutes to a final temperature of 160° C. The second non-productive stage was mixed about 2 minutes to a temperature of 160° C., and then mixed an additional 6 minutes at a temperature of 160° C. The productive stage was mixed about 2 minutes to a final temperature of 108° C.

The rubber compositions (Table 7) identified as Samples 10 and 11 are controls. Sample 12 represents the present invention and contained 5 phr of soybean oil. The samples were cured at about 150° C. for about 36 minutes. Table 8 illustrates the cure behavior and cured physical properties of Samples 10 through 12.

Sample 12, which contains 5 phr soybean oil, exhibits similar cure behavior and cured physical properties when compared to Control Sample 10, but also has improved DIN abrasion as a result of the mechanical heat treatment step.

TABLE 7

|  | Sample 7 | Sample 8 | Sample 9 |
|---|---|---|---|
| First Non-Productive |  |  |  |
| Polyisoprene (Nat 2200) | 100 | 100 | 100 |
| Carbon black, (N299) | 50 | 50 | 50 |
| Antioxidant (quinoline type) | 2 | 2 | 2 |
| Zinc oxide | 5 | 5 | 5 |
| Stearic acid | 2 | 2 | 2 |
| Processing oil (naphthenic/paraffinic) | 5 | 0 | 0 |
| Epoxidized soybean oil | 0 | 5 | 0 |
| Soybean oil | 0 | 0 | 5 |
| Second Non-Productive |  |  |  |
| Re-mill of first non-productive stage |  |  |  |
| Productive |  |  |  |
| Accelerator, sulfenamide | 1 | 1 | 1 |
| Sulfur | 1.4 | 1.4 | 1.4 |

TABLE 8

| Samples | 10 | 11 | 12 |
|---|---|---|---|
| Processing oil | 5 | 0 | 0 |
| Epoxidized soybean oil | 0 | 5 | 0 |
| Soybean oil | 0 | 0 | 5 |
| Thermomechanical mixing | Yes | Yes | Yes |
| Rheometer 150° C. |  |  |  |
| Max Torq | 39.7 | 33.3 | 37 |
| Min Torq | 9.2 | 10 | 9.5 |
| Delta Torq | 30.5 | 23.3 | 27.5 |
| T90, minutes | 14.5 | 17.5 | 14.5 |
| Stress Strain 36' at 150° C. |  |  |  |
| 100% M (MPa) | 2.3 | 1.5 | 2.1 |
| 300% M (MPa) | 12.4 | 7.6 | 10.9 |
| Tensile strength (MPa) | 23.1 | 20.9 | 22.6 |
| Elongation at Break (%) | 529 | 655 | 562 |
| Hardness |  |  |  |
| RT | 65 | 60 | 63 |
| 100° C. | 60 | 52 | 57 |
| Rebound |  |  |  |
| RT | 47 | 37 | 46 |
| 100° C. | 65 | 57 | 64 |
| DIN Abrasion (lower is better) | 118 | 201 | 108 |

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition which comprises mixing at a rubber temperature in a range of from 140° C. to 190° C. for a mixing time of from 4 to 20 minutes:

(i) 100 parts by weight of at least one uncured elastomer containing olefinic unsaturation selected the group consisting of natural rubber, conjugated diene homopolymers and copolymers and from copolymers of at least one conjugated diene and aromatic vinyl compound; with (ii) 1 to 25 phr of a fatty acid selected from the group consisting of soya fatty acid, sunflower fatty acid and mixtures thereof.

2. The method of claim 1 wherein said fatty acid is added in an amount ranging from 2 to 15 phr.

3. The method of claim 1 wherein from 10 to 150 phr of a filler is present.

4. The method of claim 3 wherein said filler is silica.

5. The method of claim 1 wherein said fatty acid has an iodine value ranging from 120 to 142 and an acid value of from 195 to 204.

6. The method of claim 1 wherein said fatty acid has an acid composition in weight percent of linoleic acid ranging from 50 to 68 percent, oleic acid ranging from 19 to 30, and palmitic acid ranging from 8 to 12 percent.

7. The method of claim 1 wherein said fatty acid is soya fatty acids.

8. The method of claim 1 wherein said fatty acid is sunflower fatty acids.

9. The method of claim 1 wherein said mixing step of the elastomer and the fatty acid is a non-productive stage.

10. The method of claim 9 wherein said non-productive stage is followed by productive stage of mixing.

11. The method of claim 10 wherein said non-productive stage is followed by a productive stage of mixing when a sulfur vulcanizing agent is added in an amount ranging from 0.5 to 8 phr.

12. The method of claim 10 wherein the productive stage involves mixing at a rubber temperature in a range from 100 to 115° C. for a mixing time of from 1 to 3 minutes.

13. The method of claim 12 where, following the productive stage, the rubber composition is vulcanized by heating the rubber composite to a rubber temperature range from 100° C. to 200° C.

14. The method of claim 1 wherein said elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

15. A rubber composition comprising the product of the method of claim 1.

16. A rubber composition comprising the product of the method of claim 13.

17. The rubber composition of claim 16 in the form of a tire, belt or hose.

* * * * *